Patented Oct. 6, 1925.

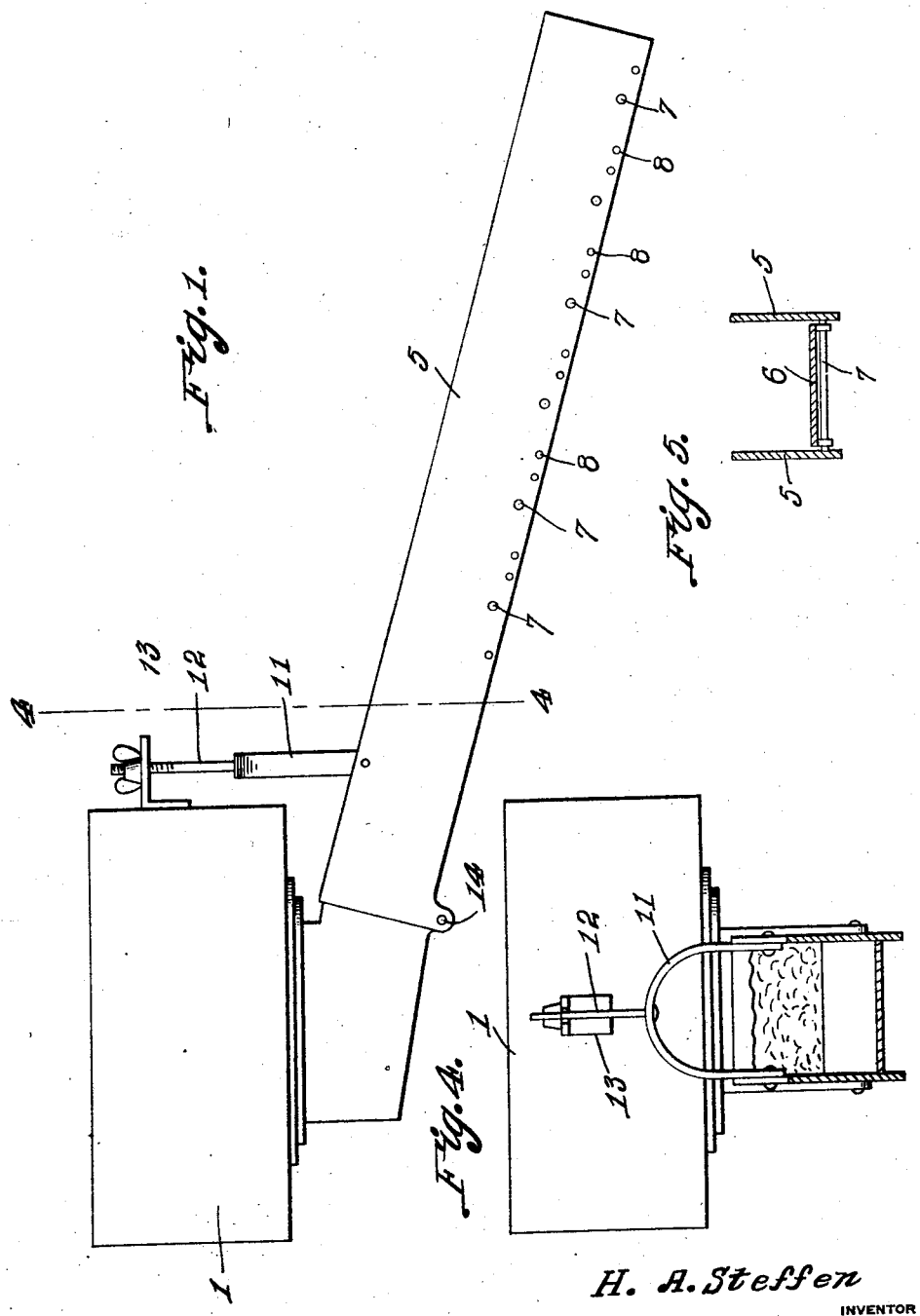

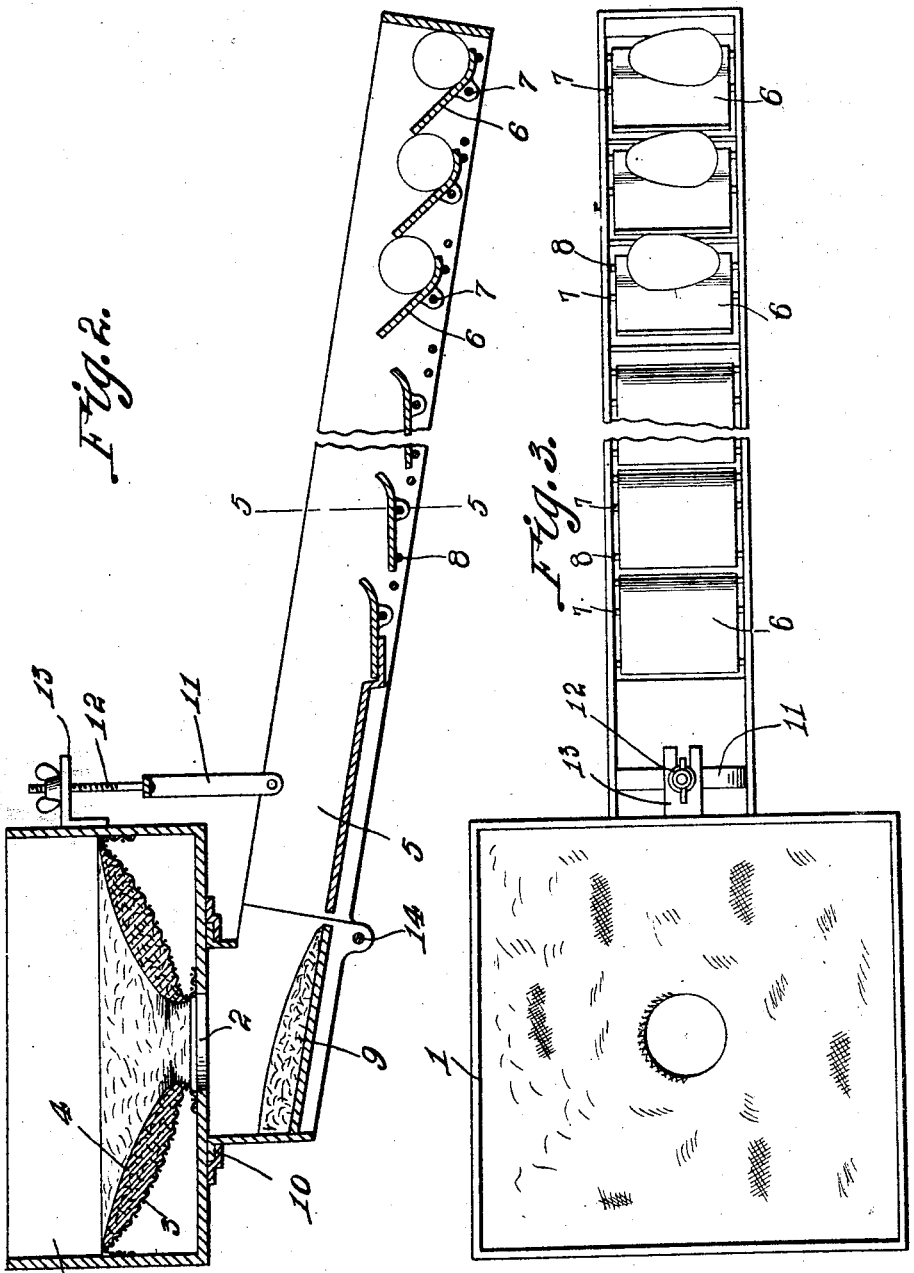

1,556,456

UNITED STATES PATENT OFFICE.

HERMAN A. STEFFEN, OF BELLINGHAM, MINNESOTA.

NEST APPLIANCE.

Application filed July 30, 1923. Serial No. 654,708.

*To all whom it may concern:*

Be it known that I, HERMAN A. STEFFEN, a citizen of the United States, residing at Bellingham, in the county of Lac qui Parle and State of Minnesota, have invented new and useful Improvements in Nest Appliances, of which the following is a specification.

This invention relates to a poultry nest, the general object of the invention being to provide means for permitting the eggs to pass from the nest and to be separated so as to prevent breakage by the hens or by coming in contact with each other.

Another object of the invention is to provide means for permitting adjustment of the parts to facilitate the gathering of the eggs.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of the invention.

Figure 2 is a longitudinal sectional view.

Figure 3 is a plan view.

Figure 4 is a section on line 4—4 of Figure 1.

Figure 5 is a section on line 5—5 of Figure 2.

In these views 1 indicates the nest box which has an opening 2 in its bottom through which the eggs will pass as they are laid. The nest is composed of wire gauze 3 and a padding 4, these parts being so arranged that the eggs will be directed through the opening as they are deposited in the nest. A chute 5 is connected with the bottom of the nest for receiving the eggs therefrom and this chute has a plurality of trap forming plates 6 therein which are pivoted to the sides of the chute by the pins 7. Each plate has its rear end curved upwardly and the parts are so arranged that the front end of each plate will normally rest upon a supporting pin 8 under the action of gravity but as soon as an egg rolls upon the plate and strikes the curved rear end thereof the plate will be tilted and cause the egg to roll down upon the next plate and this action will continue until the egg reaches the last plate when it is stopped by the end of the chute. The trap occupied by the egg will have its front end raised and thus form a stop for the next egg so that the second egg will remain in the second trap and so on until all the traps are filled. Thus the eggs are prevented from striking each other and as soon as the eggs are removed from the traps the said traps will drop back to their normal position ready to receive other eggs. The chute is provided with a cushion 9 which is located under the opening 2 so as to prevent the eggs from being broken as they drop through the opening. I rotatably connect the chute with the nest by means of the flanges 10 and I also prefer to form the chutes in two parts so that the inclination of the chute can be adjusted by means of the yoke 11 and the bolt and nut 12 which engage the bracket 13. The bolt engages a slot in the bracket so that it may be withdrawn when the chute is to be rotated. Thus the bolt is slidably and releasably supported in the bracket. The lower part of the chute is hingedly connected with the upper part, as shown at 14.

From the above it will be seen that the eggs will pass into the chute as fast as they are laid so that there is no danger of them being broken by the hens in the nest and they are prevented from striking each other as they roll down the chute. The chute can be adjusted in relation to the nest and the inclination of the chute can also be adjusted.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A nest device of the class described comprising a nest box having an opening in its bottom, a chute composed of an elbow part and an inclined part, said parts being hingedly connected together, means for rotatably connecting the elbow part with the bottom of the nest and means for adjusting the inclination of the inclined part.

In testimony whereof I affix my signature.

HERMAN A. STEFFEN.